(12) United States Patent
Zhu et al.

(10) Patent No.: US 12,305,602 B2
(45) Date of Patent: May 20, 2025

(54) HYBRID EXCITATION STARTER FOR INTERNAL COMBUSTION ENGINE

(71) Applicants: Prestolite Electric (Beijing) Limited, Beijing (CN); Prestolite Electric (Weifang) Limited, Weifang (CN)

(72) Inventors: Shujie Zhu, Beijing (CN); Bertram Fang, Beijing (CN); Sunshine Qin, Beijing (CN); Bill Wang, Beijing (CN); Will Zhang, Beijing (CN)

(73) Assignees: PRESTOLITE ELECTRIC (BEIJING) LIMITED, Beijing (CN); PRESTOLITE ELECTRIC (WEIFANG) LIMITED, Weifang (CN)

( * ) Notice: Subject to any disclaimer, the term of this patent is extended or adjusted under 35 U.S.C. 154(b) by 156 days.

(21) Appl. No.: 18/015,590

(22) PCT Filed: Jul. 17, 2020

(86) PCT No.: PCT/CN2020/102611
§ 371 (c)(1),
(2) Date: Jan. 11, 2023

(87) PCT Pub. No.: WO2022/011666
PCT Pub. Date: Jan. 20, 2022

(65) Prior Publication Data
US 2023/0250785 A1 Aug. 10, 2023

(51) Int. Cl.
*F02N 11/08* (2006.01)
*H02K 21/26* (2006.01)

(52) U.S. Cl.
CPC ......... *F02N 11/0803* (2013.01); *H02K 21/26* (2013.01)

(58) Field of Classification Search
CPC ..... F02N 11/0803; F02N 11/00; H02K 21/26; H02K 2213/03; H02K 1/148; H02K 23/04; H02K 1/17
See application file for complete search history.

(56) References Cited

U.S. PATENT DOCUMENTS

| | | | |
|---|---|---|---|
| 2003/0122439 A1 | 7/2003 | Horst | |
| 2010/0176677 A1* | 7/2010 | Labbe | H02K 1/17 310/216.076 |

FOREIGN PATENT DOCUMENTS

| | | |
|---|---|---|
| CN | 101465568 A | 6/2009 |
| CN | 102035333 A | 4/2011 |

(Continued)

*Primary Examiner* — Joseph Ortega
(74) *Attorney, Agent, or Firm* — MUNCY, GEISSLER, OLDS & LOWE, P.C.

(57) ABSTRACT

A hybrid excitation starter includes a machine housing, an armature, and an electrical excitation structure and a permanent magnet structure provided in the machine housing, and the electrical excitation structure includes a plurality of electrical excitation magnetic poles and excitation coil windings. The electrical excitation magnetic poles are uniformly mounted on the machine housing corresponding to the armature and air gaps are formed between the electrical excitation magnetic poles and the armature; the permanent magnet structure includes a plurality of permanent magnet magnetic poles, which are provided corresponding to the electrical excitation magnetic poles, and are mounted on the machine housing or the electrical excitation magnetic poles respectively, and a magnetic potential formed by coupling the electrical excitation magnetic poles and the permanent magnet magnetic poles together forms a closed magnetic flux linkage by means of the machine housing, the armature and the air gaps.

20 Claims, 11 Drawing Sheets

(56) References Cited

FOREIGN PATENT DOCUMENTS

| | | | |
|---|---|---|---|
| CN | 105830319 | A | 8/2016 |
| CN | 106655560 | A | 5/2017 |
| FR | 3039016 | A1 | 1/2017 |

* cited by examiner

HYBRID EXCITATION STARTER FOR INTERNAL COMBUSTION ENGINE

BACKGROUND OF THE INVENTION

1. Field of the Invention

The present invention relates to a starter for starting an internal combustion engine, in particular to a hybrid excitation starter integrating electrical excitation and permanent magnet excitation for the internal combustion engine.

2. Related Art

As a core component for startup of the internal combustion engine, the starter works following the principle that the starter rotates and overcomes the moment of resistance of the internal combustion engine to drive the stationary internal combustion engine to ignition and start. As disclosed in the prior art, the starters are divided into permanent magnet excitation and electrical excitation according to modes for creating the magnetic fields:

In the permanent magnet excitation starter, "N" poles and "S" poles generated by magnetizing magnetic poles of the permanent magnet are alternately arranged on the stator. Energizing only the armature winding through an accumulator, the energized armature winding conductor rotates under the action of the magnetic field generated by the magnetic poles of the permanent magnet, thus realizing the conversion of the magnetic energy and electric energy to the mechanical energy. The permanent magnet excitation starter is characterized by its simple structure, but it is difficult to achieve the high output power required by heavy duty internal combustion engines due to the limitation of low magnetic energy product of permanent magnet materials and limitation of space in the starter.

In the electrical excitation starter, each individual stator coil wound on magnetic poles are connected in series or parallel to form excitation coil windings, and a magnetic field with alternately arranged "N" poles and "S" poles is formed on each magnetic pole after energizing the excitation coil windings. Energizing the excitation coil windings and armature windings through an accumulator, the energized armature winding conductor rotates under the action of the magnetic field generated by the excitation coil windings, thus realizing the conversion of the electric energy to the mechanical energy. Referring to FIG. 1, which is a structural diagram of an electrical excitation starter in the prior art. It includes a stator housing 10, magnetic poles 20, stator coil windings 30, magnetic pole screws 40 and an armature 50. Each individual stator coil is connected in series or parallel to form the stator coil windings 30. The stator coil windings 30 are mounted on the magnetic poles 20. The magnetic poles 20 is cold drawn or hot forged from mild steel and is screwed or riveted on the stator housing 10 by means of the magnetic pole screws 40. An air gap $\delta$ is formed between the armature 50 and the magnetic pole 20. The electrical excitation starter is characterized by low working current during no-load operation, small voltage drop across the stator coil windings 30 and the armature 50, and high electric potential at the input end of the starter. With the low no-load current, the magnetic potential of the magnetic field generated by electrical excitation and magnetic fluxes of the air-gap are small. In this case, if an induced counter-electromotive force of equal magnitude and opposite direction to the electric potential at the input end is generated in the armature 50, the armature 50 is required to rotate at a very high speed. The no-load speed increases with the decreasing no-load current. The main hazards of high no-load speed are shown below:

a) it is unfavorable for driving gears of the starter to engage into the flywheel ring gear of the internal combustion engine, resulting in damaged flywheel ring gear;

b) when the starter works at a high speed, rotating components and supporting mechanisms of the starter are damaged by centrifugal force, which is formed by dynamic unbalance of the rotating components;

c) when the starter works at a high speed, electric brushes, commutators and the like face excessive wear, which affects the lifetime of the starter; and d) after being ignited by the starter, the internal combustion engine keeps running at idling condition; in this case, if the reverse driving speed transmitted from the flywheel ring gear to the driving gears is faster than the no-load speed of the starter, the one-way clutch will be in a normal reverse slipping state; otherwise, if the no-load speed of the starter is faster than the reverse driving speed transmitted from the flywheel ring gear to the driving gears, the one-way clutch will fail because it is not able to slip.

To lower the no-load speed of the electrical excitation starter, the number of turns of the stator coil winding 30 or the cross-sectional area of copper wires forming the stator coil winding 30 can be increased. However, the parameter adjustment has the following disadvantages:

a) the space for the stator is confined, so the number of turns of the stator coil winding 30 or the cross-sectional area of the copper wires forming the stator coil winding 30 can only increase to a limited extent; and b) the adjustment of increasing the number of turns of the stator coil winding 30 or the cross-sectional area of the copper wires forming the stator coil winding 30 will increase copper loss of the starter, reduce the efficiency and output power of the starter;

Alternatively, to lower the no-load speed of the electrical excitation starter, the number of winding slots of the armature 50 may be increased. The parameter adjustment has the following disadvantages:

a) the space for the armature winding core is confined, so the number of slots is not able to be increased arbitrarily; and b) under the condition that the space for the armature winding core is confined, if the number of slots is increased, the cross-sectional area of each slot and the cross-sectional area of copper wires of the armature winding are necessarily reduced, resulting in rising in the current density in the armature winding and damaging the armature winding;

Alternatively, to lower the no-load speed of the electrical excitation starter, the air gap $\delta$ between the armature winding and the magnetic pole may be narrowed; however, the parameter adjustment has the following defects:

a) as the armature winding rotates in the stator at a high speed, it is easily damaged by mechanical scuffing with the narrowed air gap $\delta$, so the manufacturing difficulty is increased; and b) when the starter is running at a load, because of the working current increases dramatically, and the air-gap magnetic flux density increases with the decreasing air gap $\delta$, so that the magnetic saturation will occur prematurely on the armature assembly core, which affects the load characteristics of the starter.

To sum up, due to their singleness of the magnetic source, no-load characteristics, and load characteristic such as load speed and load torque of the electrical excitation starters and the permanent magnet excitation starters in the prior art are not able to be adjusted independently and separately. That is, the adjustment of any one characteristic will affect another interactively, so it is difficult to achieve a satisfactory result.

SUMMARY OF THE INVENTION

The present invention provides a hybrid excitation starter for an internal combustion engine, which consists of two magnetic sources of the electrical excitation and the permanent magnet excitation, thereby solving the problem that the electrical excitation starters and the permanent magnet excitation starters in the prior art only adopt one single magnetic source of the electrical excitation or the permanent magnet excitation, such that the no-load characteristics and load characteristics such as speed and torque characteristic are not able to be adjusted independently and separately.

To solve the above-mentioned problem, the present invention provides a hybrid excitation starter, wherein comprising a machine housing, an armature, and an electrical excitation structure and a permanent magnet structure provided in the machine housing the armature and the machine housing are coaxially arranged, magnetic paths of the electrical excitation structure and the permanent magnet structure are coupled in a direction of normal coupling of permanent magnet magnetic paths, the electrical excitation structure comprises a plurality of electrical excitation magnetic poles and excitation coil windings, the electrical excitation magnetic poles are uniformly mounted on the machine housing corresponding to the armature and air gaps are formed between the electrical excitation magnetic poles and the armature, each of the electrical excitation magnetic poles is provided with the excitation coil windings respectively, the permanent magnet structure comprises a plurality of permanent magnet magnetic poles, and the permanent magnet magnetic poles are provided corresponding to the electrical excitation magnetic poles respectively, and are mounted on the machine housing or the electrical excitation magnetic poles respectively, and a magnetic potential formed by coupling the electrical excitation magnetic poles and the permanent magnet magnetic poles together forms a closed magnetic flux linkage by means of the machine housing, the armature and the air gaps, magnetic fields of the electrical excitation magnetic poles and the permanent magnet magnetic poles are in the same direction, thereby controlling the speed characteristic and the torque characteristic of no-load and/or load operation of the starter by independently adjusting parameters of the excitation coil winding.

In the hybrid excitation starter, wherein the plurality of permanent magnet magnetic poles are arranged in the radial direction of the armature respectively, one permanent magnet magnetic pole is mounted on each of the electrical excitation magnetic poles correspondingly, and the permanent magnet magnetic poles are located on the center lines of the electrical excitation magnetic poles and connected in series with the magnetic paths of the electrical excitation magnetic poles.

In the hybrid excitation starter, wherein the plurality of permanent magnet magnetic poles are arranged in the radial direction of the armature respectively, each of the permanent magnet magnetic poles is connected to the corresponding electrical excitation magnetic pole and the machine housing, and the magnetic paths of the permanent magnet magnetic poles are connected in parallel with the magnetic paths of the electrical excitation magnetic poles.

In the hybrid excitation starter, wherein a plurality of groups of the permanent magnet magnetic poles are arranged in the radial direction of the armature respectively, one group of the permanent magnet magnetic poles is mounted on each of the electrical excitation magnetic poles correspondingly, each group of the permanent magnet magnetic poles is symmetrically arranged in a V shape or parallel to each other with respect to the center lines of the electrical excitation magnetic poles, and the magnetic paths of the permanent magnet magnetic poles are connected in series with the magnetic paths of the electrical excitation magnetic poles.

In the hybrid excitation starter, wherein a plurality of groups of the permanent magnet magnetic poles are arranged in the radial direction of the armature respectively, each group of the permanent magnet magnetic poles is connected to the corresponding electrical excitation magnetic poles and the machine housing, each group of the permanent magnet magnetic poles is symmetrically arranged in a V shape or parallel to each other with respect to the center lines of the electrical excitation magnetic poles, and the magnetic paths of the permanent magnet magnetic poles are connected in parallel or series with the magnetic paths of the electric excitation magnetic poles.

In the hybrid excitation starter, wherein the magnetic fields of the electrical excitation structure and the permanent magnet structure are directly coupled or coupled by means of a magnetic conductive bridge.

In the hybrid excitation starter, wherein the permanent magnet magnetic poles have a cylindrical, rectangular or polygonal cross-section.

In the hybrid excitation starter, wherein the hybrid excitation starter is a brushed starter or a brushless starter.

The present invention also provides a hybrid excitation starter, wherein comprising a machine housing, an armature, and an electrical excitation structure and a permanent magnet structure provided in the machine housing, the armature and the machine housing are coaxially arranged, magnetic paths of the electrical excitation structure and the permanent magnet structure are coupled in a direction of tangential coupling of permanent magnet magnetic paths, the electrical excitation structure comprises a plurality of electrical excitation magnetic poles and excitation coil windings, the electrical excitation magnetic poles are uniformly mounted on the machine housing corresponding to the armature and air gaps are formed between the electrical excitation magnetic poles and the armature, each of the electrical excitation magnetic poles is provided with the excitation coil windings respectively, the permanent magnet structure comprises a plurality of permanent magnet magnetic poles, and the permanent magnet magnetic poles are provided corresponding to the electrical excitation magnetic poles respectively, and are mounted on the machine housing or the electrical excitation magnetic poles respectively, and a magnetic potential formed by coupling the electrical excitation magnetic poles and the permanent magnet magnetic poles together forms a closed magnetic flux linkage by means of the machine housing, the armature and the air gaps, magnetic fields of the electrical excitation magnetic poles and the permanent magnet magnetic poles are in the same direction, thereby controlling the speed characteristic and the torque characteristic of no-load and/or load operation of the starter by independently adjusting parameters of the excitation coil winding, the plurality of permanent magnet magnetic poles are uniformly arranged in the circumferential direction of the armature respectively and mounted between the adjacent electrical excitation magnetic poles, each of the permanent magnet magnetic poles is connected to the left and right adjacent electrical excitation magnetic poles, and the magnetic paths of the permanent magnet magnetic poles are connected in parallel with the magnetic paths of the electrical excitation magnetic poles.

In the hybrid excitation starter, wherein the plurality of permanent magnet magnetic poles are mounted on the machine housing between the adjacent electrical excitation magnetic poles.

The accompanying drawings and specific embodiments are combined for describing the present invention in detail as below, but not to limit the present invention.

Figure 1:
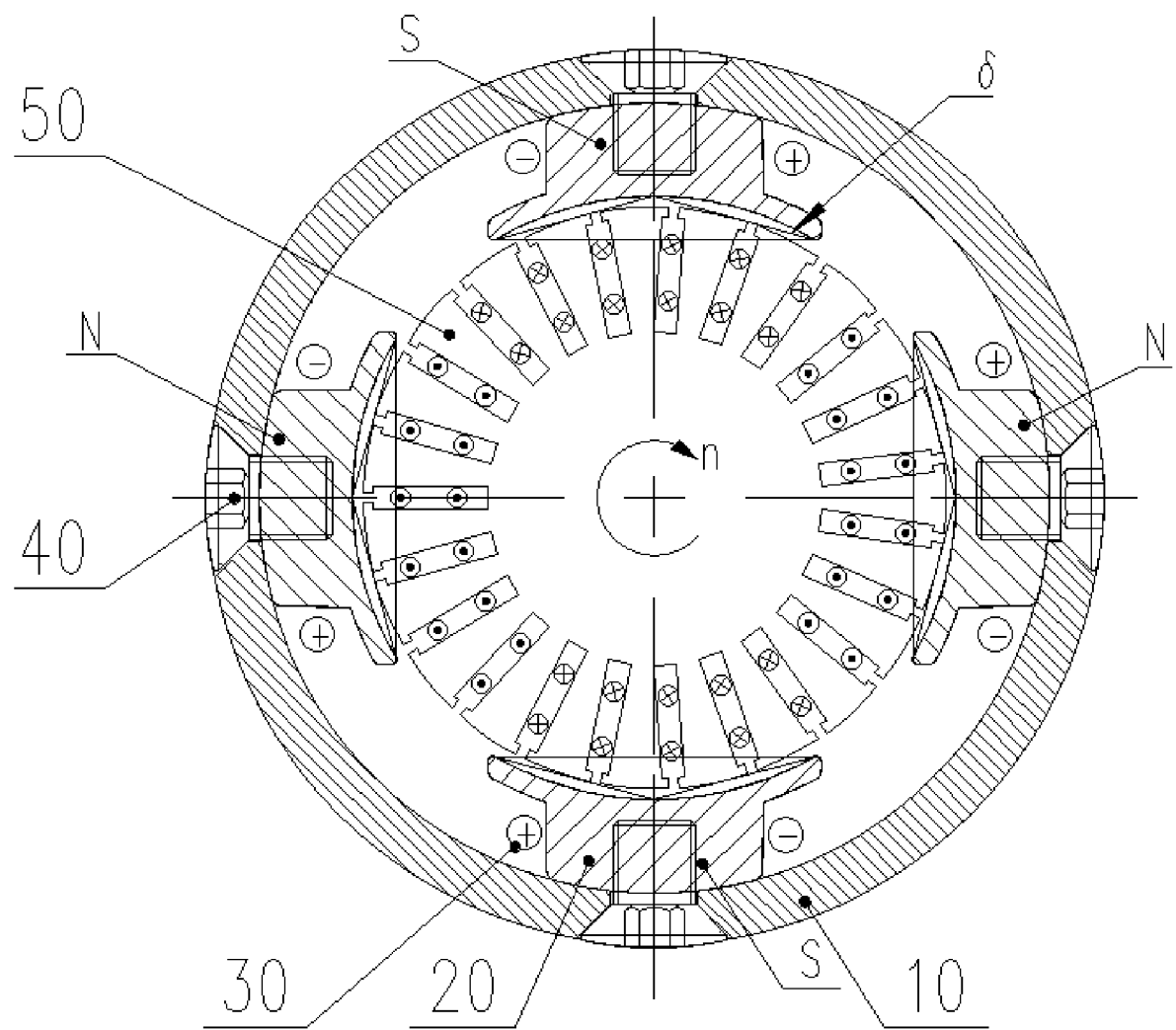
FIG. 1 is a structural diagram of the electrical excitation starter in the prior art.

Wherein, reference signs:

PRIOR ART

10 stator housing
20 magnetic pole
30 stator coil winding
40 magnetic pole screw
50 armature
δ air gap
The present invention
1 machine housing
2 electrical excitation magnetic pole
3 excitation coil winding
4 magnetic pole screw
5 armature
6 permanent magnet magnetic pole
δ air gap
30b terminal
100 electromagnetic switch

PREFERABLE EMBODIMENTS OF THE INVENTION

Hereinafter, the structural principle and working principle of the present invention are described in detail with reference to the accompanying drawings.

The present invention provides a hybrid excitation starter for an internal combustion engine, which adopts two magnetic sources consisting of an electrical excitation structure and a permanent magnet structure. In no-load condition that a driving gear of the starter is not engaged into a flywheel ring gear, since current supplied to a stator winding of the electrical excitation structure is small, an air-gap magnetic flux density generated by the electrical excitation structure is low, which has a relatively slight impact on the no-load speed. The magnetic field generated by the permanent magnet structure plays a major role. That is, a relatively high air-gap magnetic flux density is generated by the magnetic field of the permanent magnet to effectively decrease the no-load speed. In load condition that the driving gear of the starter is engaged into the flywheel ring gear and drives the engine, with increase of the load, the current supplied to the stator winding of the electrical excitation structure increases. In this case, the magnetic field generated by the stator winding of the electrical excitation structure plays a major role in the starter. To realize the ideal no-load speed, the permanent magnets with a corresponding magnetic flux are provided to effectively control and adjust the no-load speed. As the no-load speed is able to be controlled without adjustment of number of turns, resistance and the like of the electrically excited stator winding, and the method of controlling the no-load speed by means of the magnetic field of the permanent magnet almost has no interaction on the load condition. The load characteristics are mainly controlled by electrical excitation. The parameters of the excitation coil winding 3 are adjusted independently and separately to adjust and optimize the speed characteristic and the torque characteristic of the starter in load condition, without interaction and constraint by the no-load speed. For instance, the number of turns and cross-sectional area of the excitation coil winding 3 are adjusted to change an internal resistance of the hybrid excitation starter, thus adjusting the exciting current, the magnetic potential and the air-gap magnetic flux; the exciting current is used to adjust the torque characteristic of the hybrid excitation starter in load operation; the magnetic potential and the air-gap magnetic flux are used to adjust the speed characteristic and the like of the hybrid excitation starter in load operation, so it is possible to independently and separately control the no-load characteristics as well as the speed characteristic and the torque characteristic of the load characteristics of the starter.

Figure 2:
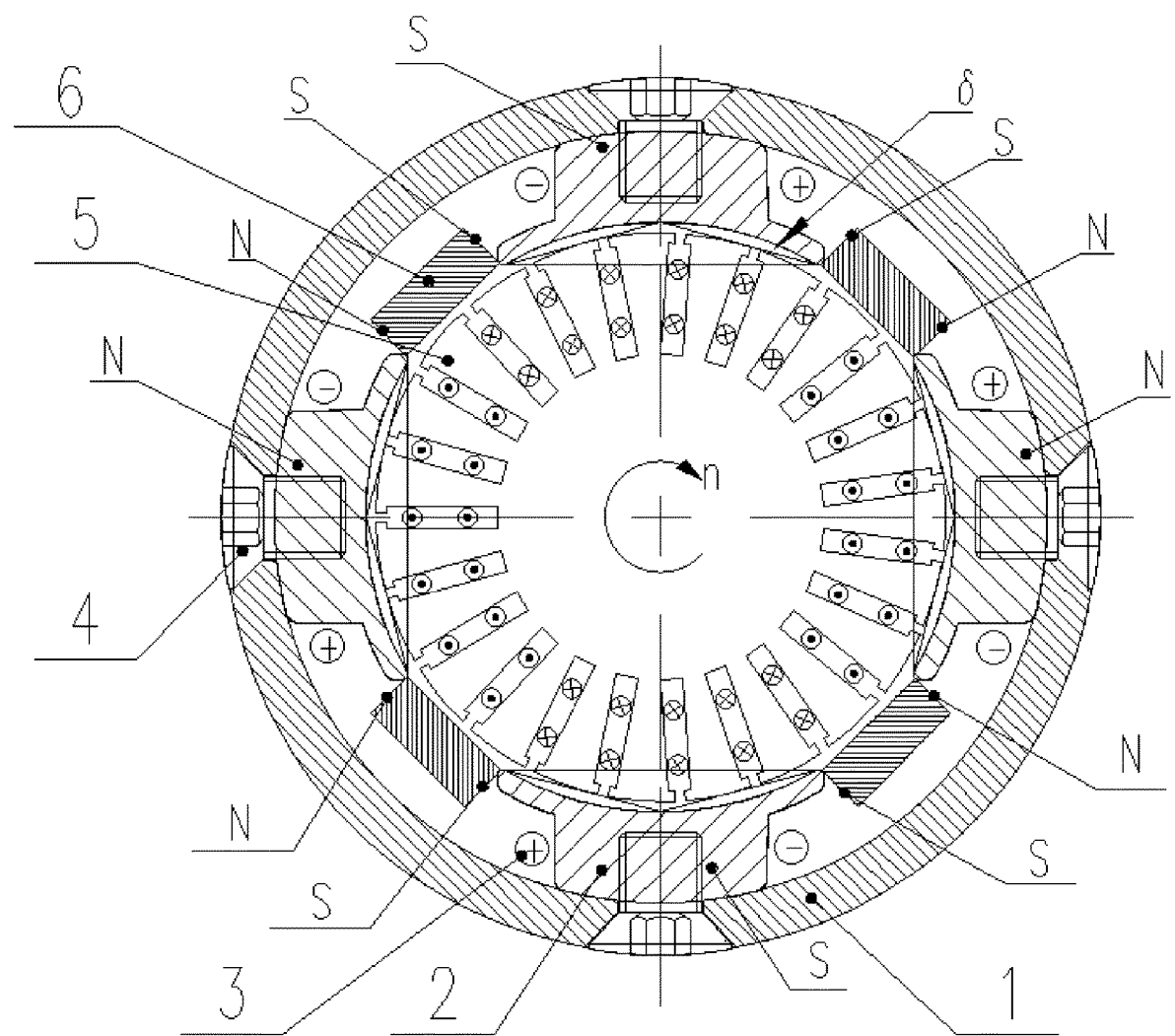
FIG. 2 is a structural diagram of embodiment one of the present invention.

Referring to FIG. 2, which is a structural diagram of embodiment one of the present invention. The hybrid excitation starter provided by the present invention, which is suitable for both a brushed starter and a brushless starter, comprises a machine housing 1, an armature 5, and an electrical excitation structure and a permanent magnet structure provided in the machine housing 1. The armature 5 and the machine housing 1 are coaxially arranged. The electrical excitation structure comprises a plurality of electrical excitation magnetic poles 2 and excitation coil windings 3, the electrical excitation magnetic poles 2 are uniformly mounted on the machine housing 1 corresponding to the armature 5, and air gaps δ are formed between the electrical excitation magnetic poles 2 and the armature 5. Each of the electrical excitation magnetic poles 2 is provided with the excitation coil windings 3. The permanent magnet structure includes a plurality of permanent magnet magnetic poles 6, and the permanent magnet magnetic poles 6 are provided corresponding to the electrical excitation magnetic poles 2 respectively, and are mounted on the machine housing 1 or the electrical excitation magnetic poles 2 respectively, and one or more permanent magnet magnetic poles 6 may be mounted on each electrical excitation magnetic pole 2 respectively; the magnetic potential formed by coupling of the electrical excitation magnetic poles 2 and the permanent magnet magnetic poles 6 together forms a closed magnetic flux linkage by means of the machine housing 1, the armature 5 and the air gaps δ, and the parameters of the excitation coil windings 3 are independently adjusted to control the speed characteristic and the torque characteristic of the starter in no-load and/or load condition.

Figure 3:
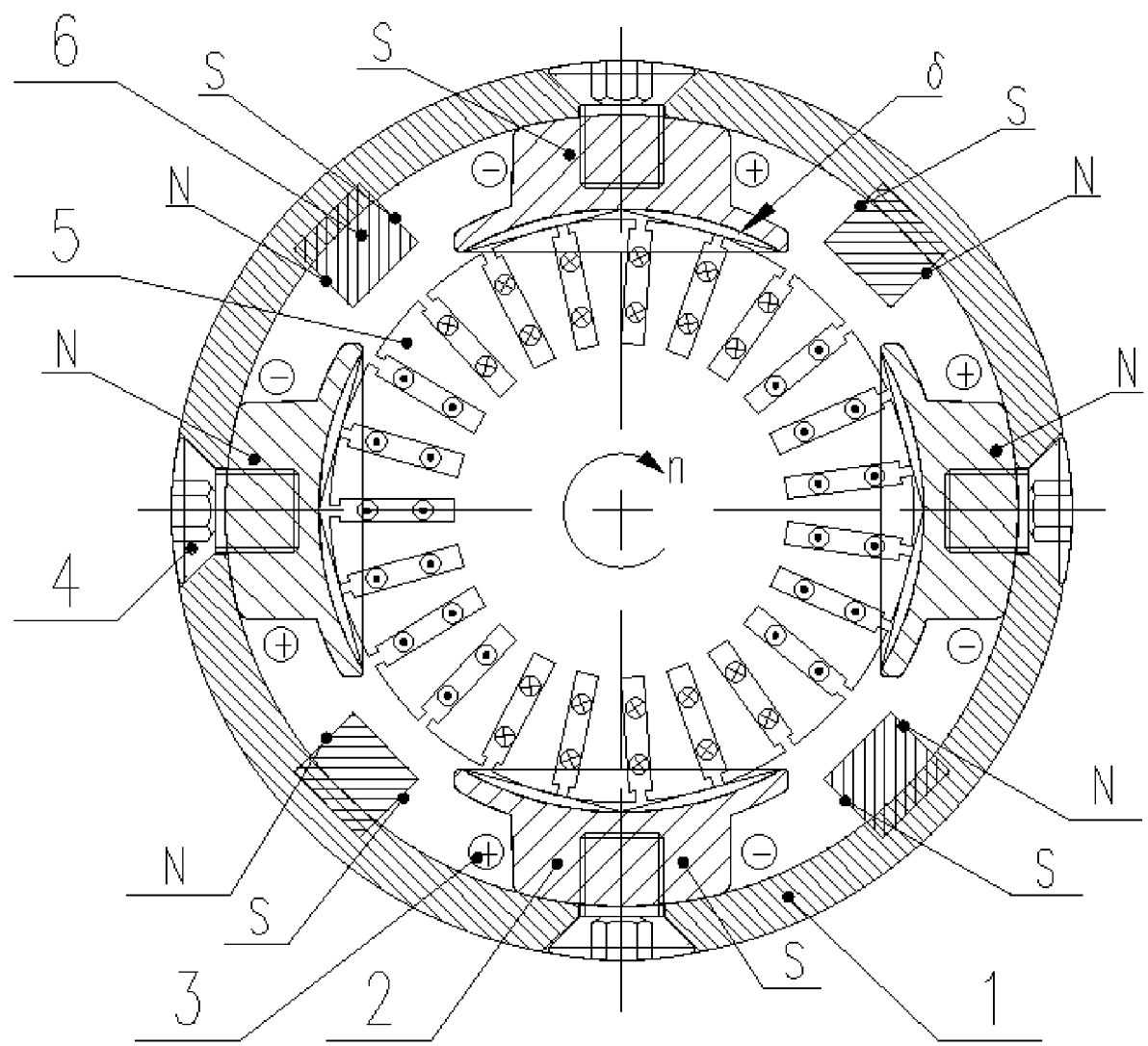
FIG. 3 is a structural diagram of embodiment two of the present invention.

The magnetic fields of the electrical excitation structure and the permanent magnet structure are directly coupled or coupled through a magnetic conductive bridge. The direct coupling is shown in FIGS. 2-7. According to different coupling methods of the permanent magnet magnetic paths and the electrical excitation magnetic paths, magnetic paths may be connected in series or in parallel. The cross-section of the permanent magnet magnetic poles 6 may be cylindrical, bar-shaped, rectangular, polygonal or special-shaped; each individual stator coil is connected in series or parallel to form the excitation coil windings 3, the excitation coil windings 3 are mounted on the electrical excitation magnetic poles 2, and the electrical excitation magnetic poles 2 are screwed or riveted on the machine housing 1 by means of magnetic pole screws 4. The electrical excitation magnetic poles 2 may be cold drawn or hot forged from mild steel and is screwed or riveted on the machine housing 1 by means of the magnetic pole screws 4. The permanent magnet magnetic poles 6 may be directly mounted on the machine housing 1 (as shown in FIG. 3) or directly mounted on the electrical excitation magnetic poles 2 (as shown in FIGS. 2, 4-7) or mounted on the machine housing 1 by means of the magnetic conductive bridge (not shown), and the air gaps δ are formed between the armature 5 and the electrical excitation magnetic poles 2. For normal startup, the electrical excitation is used to drive the internal combustion engine to work. The no-load speed controlled by the permanent magnet excitation is only the preparation before the driving gear of the starter engages into the flywheel ring gear of the engine.

In the hybrid excitation starter, the permanent magnet magnetic paths may be in tangential (circumferential) coupling or normal (radial) coupling according to different coupling directions of the permanent magnet magnetic paths and electrical excitation magnetic paths. In the embodiment one, the magnetic paths of the electrical excitation structure and the permanent magnet structure are coupled in the direction of tangential coupling of the permanent magnet magnetic paths, the plurality of permanent magnet magnetic poles 6 are uniformly arranged in the circumferential direction of the armature 5, each of the permanent magnet magnetic poles 6 is mounted between the adjacent electrical excitation magnetic poles 2 respectively and connected thereto, and the magnetic paths of the permanent magnet magnetic poles 6 are connected in parallel with the magnetic paths of the electrical excitation magnetic poles 2.

Referring to FIG. 3, which is a structural diagram of embodiment two of the present invention. In the embodiment, the magnetic paths of the electrical excitation structure and the permanent magnet structure are coupled in the direction of tangential coupling of the permanent magnet magnetic paths, the plurality of permanent magnet magnetic poles 6 are uniformly arranged in the circumferential direction of the armature 5 and mounted on the machine housing 1 between the adjacent electrical excitation magnetic poles 2, and the magnetic paths of the permanent magnet magnetic poles 6 are connected in parallel with the magnetic paths of the electrical excitation magnetic poles 2.

Figure 4:
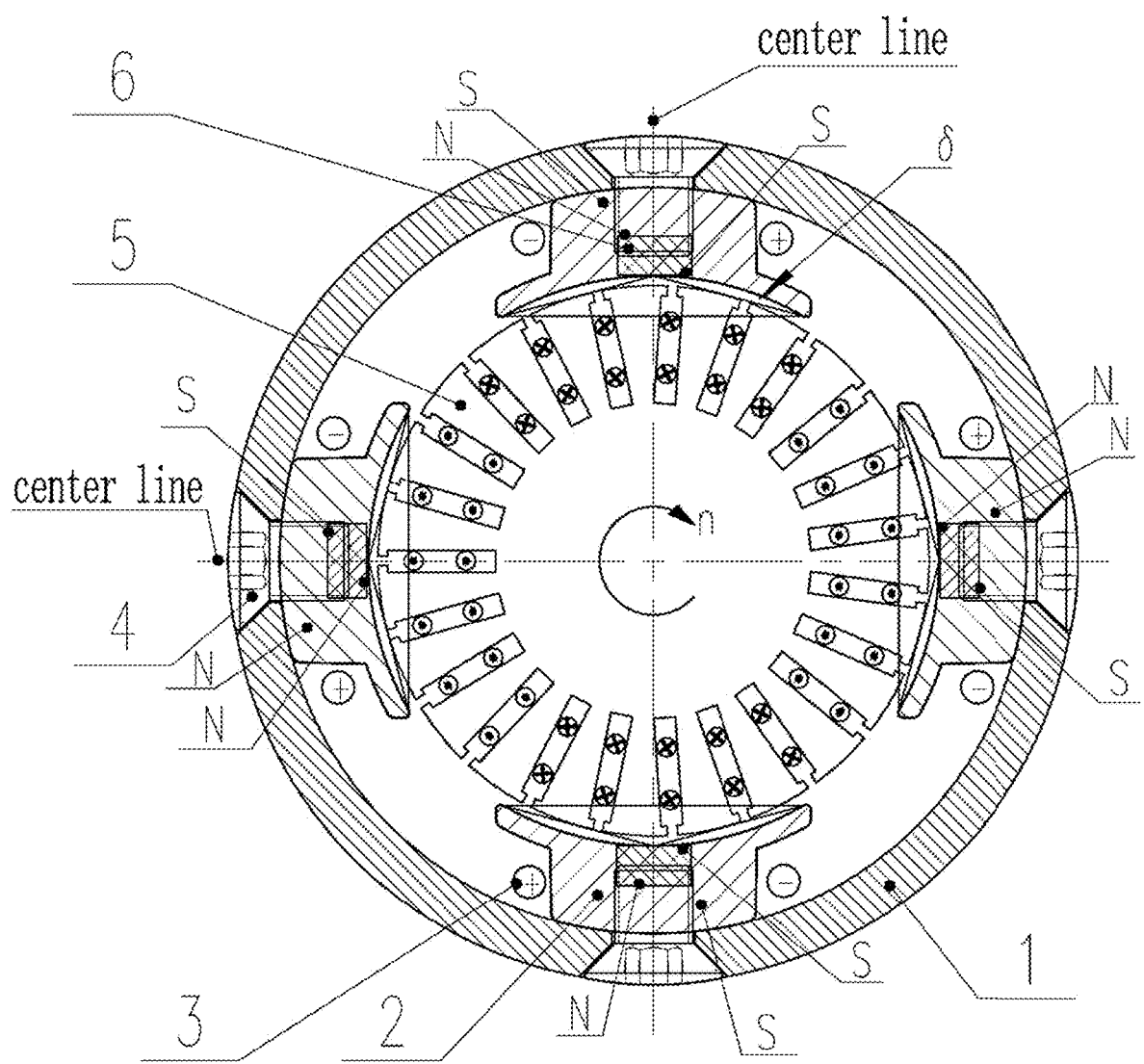
FIG. 4 is a structural diagram of embodiment three of the present invention.

Referring to FIG. 4, which is a structural diagram of embodiment three of the present invention. In the embodiment, the magnetic paths of the electrical excitation structure and the permanent magnet structure are coupled in the direction of normal coupling of the permanent magnet magnetic paths, and the plurality of permanent magnet magnetic poles 6 are arranged in the radial direction of the armature 5 respectively. One permanent magnet magnetic pole 6 is mounted on each of the electrical excitation magnetic poles 2 correspondingly, and the permanent magnet magnetic poles 6 are located on the center lines of the electrical excitation magnetic poles 2 and connected in series with the magnetic paths of the electrical excitation magnetic poles 2. As shown in FIG. 4, the bar-shaped permanent magnet magnetic poles 6 are mounted on the electrical excitation magnetic poles 2, and the magnetic fields respectively generated by the excitation coil windings 3 and the permanent magnet magnetic poles 6 are coupled in series on the electrical excitation magnetic poles 2 of the stator, forming the closed magnetic flux linkage from the N pole, the air gap δ, the armature 5, the air gap δ through to the S pole, and then returning to the N pole through the machine housing 1. In no-load condition, as the exciting current in the excitation coil windings 3 is small, the magnetic potential generated by the excitation coil windings 3 on the electrical excitation magnetic poles 2 is low and the magnetic flux is low. In this case, the permanent magnet magnetic poles 6 play a major role. The magnetic field generated by the permanent magnet magnetic poles 6 has a relatively high air-gap magnetic flux in the air gaps δ, and the armature 5 may remarkably decrease the no-load speed under the action of the magnetic flux.

Figure 8:
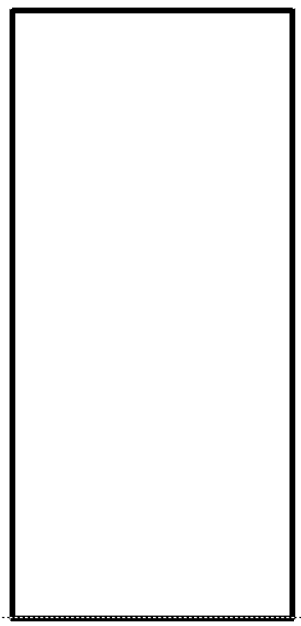
FIG. 8 is a comparison diagram of no-load speed between embodiment three of the present invention and the prior art.

In embodiment three, after implementation of the technical solution as shown in FIG. 4, the experimental test results are shown in FIG. 8. In FIG. 8, the no-load speed of the electrical excitation starter in the prior art, which is 5645 RPM, is shown on the left, and the no-load speed of the hybrid excitation starter for the internal combustion engine of the present invention, which is 4793 RPM, is shown on the right, indicating that the no-load speed of the present invention is decreased by about 15%. In load condition, with increase of the load, the exciting current in the excitation coil windings 3 increases, and the electrical excitation structure plays a major role. The excitation coil windings 3 generate the magnetic field on the electrical excitation magnetic poles 2. Compared with the magnetic field generated by the electrical excitation, the magnetic field generated by the permanent magnet magnetic poles 6 only play a supporting role. Therefore, without changing the electromagnetic parameters of the excitation coil windings 3, load characteristics of the hybrid excitation starter such as the load speed and the load torque have no significant difference from that of the electrical excitation starter in the prior art.

Figure 9:
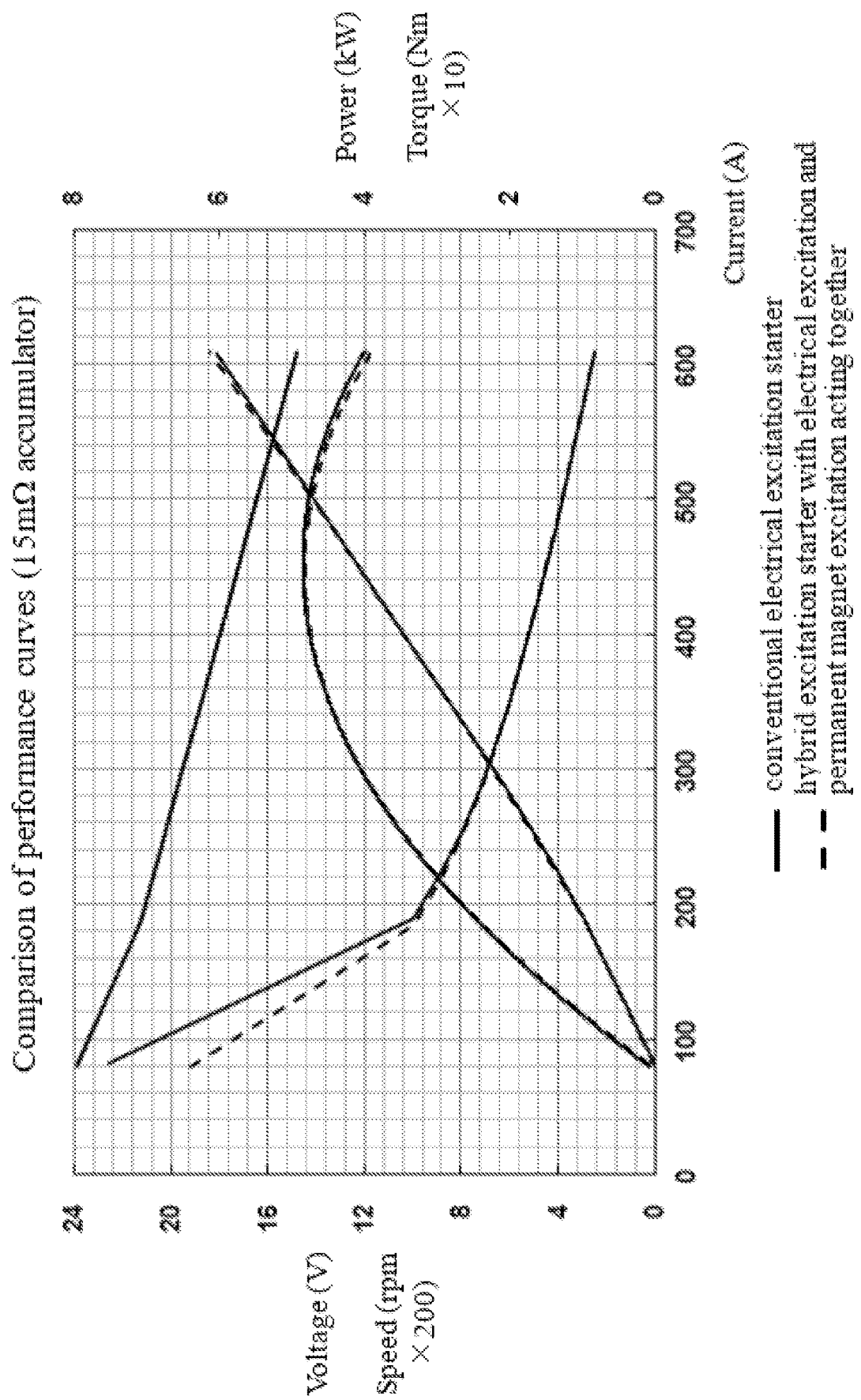
FIG. 9 is a comparison diagram of load characteristics between embodiment three of the present invention and the prior art.

In embodiment three, after implementation of the technical solution as shown in FIG. 4, the experimental test results are shown in FIG. 9. Compared with the electrical excitation starter in the prior art, load characteristics of the hybrid excitation starter for the internal combustion engine such as the load speed, the load torque, and the power have no significant change, and corresponding curves almost coincide with each other. To adjust and optimize the load characteristics of the hybrid excitation starter for the internal combustion engine such as load speed, the load torque, etc., it can be achieved by adjustment of the electromagnetic parameters of the excitation coil windings 3, without any interaction on the no-load speed.

Figure 10:
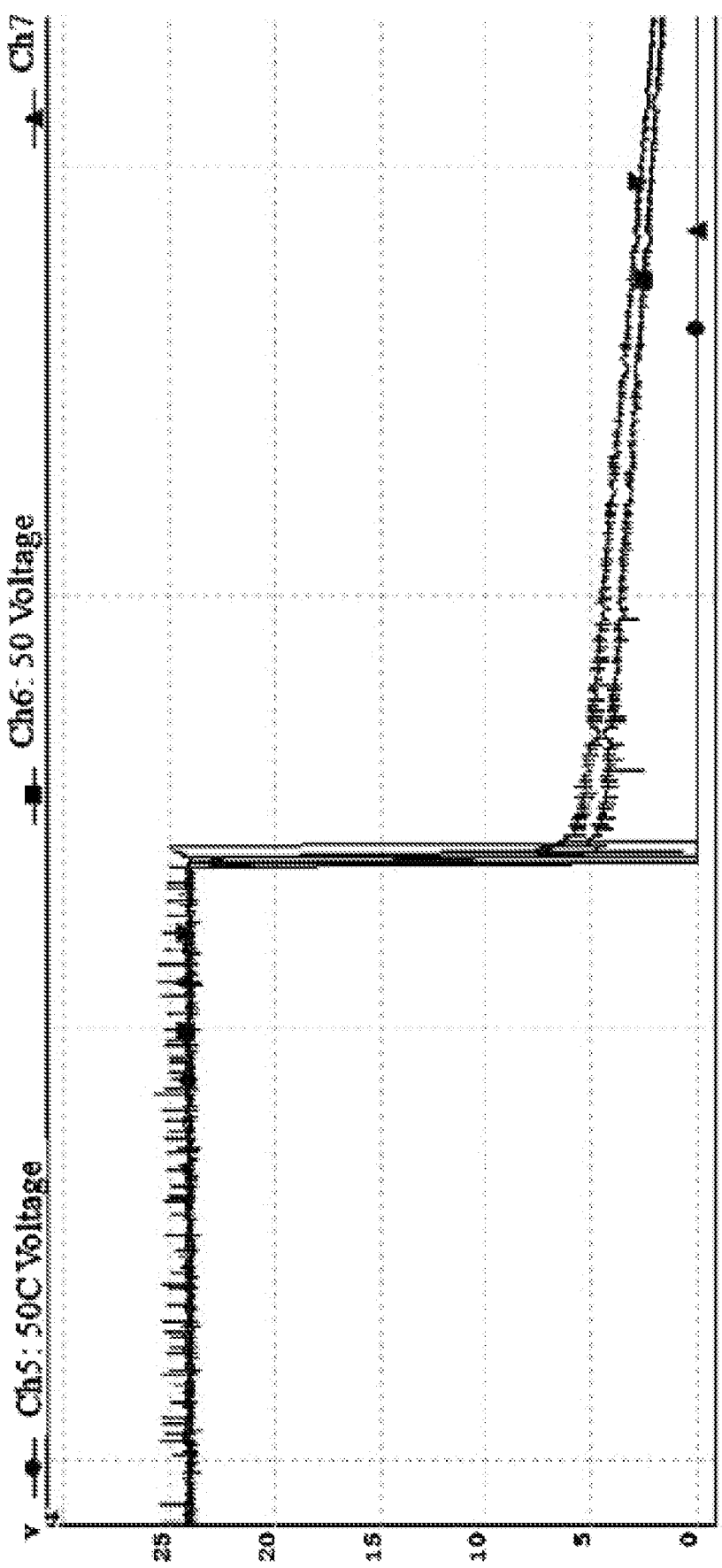
FIG. 10 is a schematic diagram of a tail voltage of embodiment three of the present invention.
Figure 11:
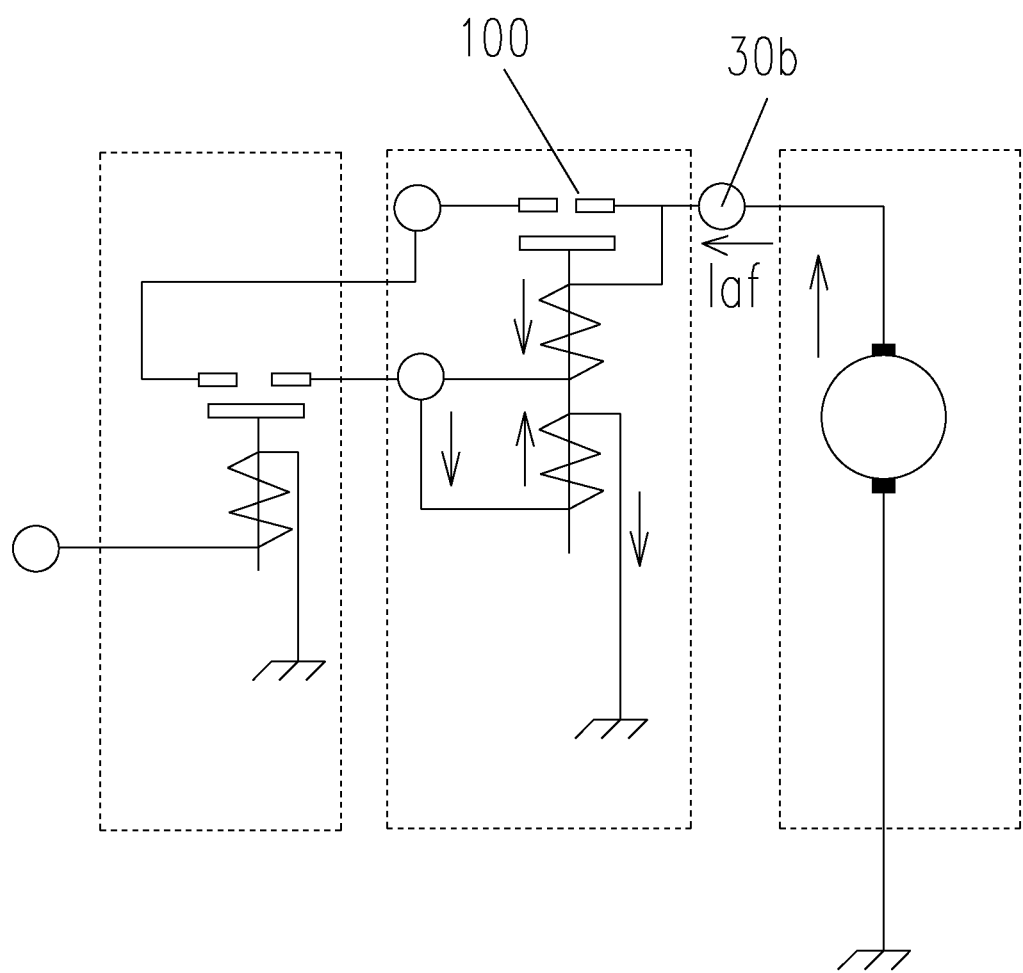
FIG. 11 is a schematic diagram of the influence of the tail voltage in FIG. 10 on the starter circuit.

In embodiment three, after implementation of the technical solution as shown in FIG. 4, the experimental test results are shown in FIG. 10. An oscilloscope shows that after the hybrid excitation starter is powered off, the armature 5 continuously rotating for 1-2 seconds due to inertial force till complete stop, during which a tail voltage of up to 5V is induced in the armature 5 due to the permanent magnetic field of the permanent magnet magnetic poles 6, and the tail voltage will decrease to 0V with the stop of the armature 5. As shown in FIG. 11, the tail voltage is applied to a terminal 30*b* of the hybrid excitation starter, and the induced current Iaf flows through two coils connected in series by means of the electromagnetic switch 100, as indicated by the arrow. The two coils connected in series are opposite in winding direction while the currents flow through them are in the same direction, so that an unbalanced electromagnetic force in the two coils will not cause the electromagnetic switch to close again after power off. In addition, the duration of 1-2 seconds is short and the induced current Iaf flows through the two coils at the voltage of up to 5V is small, which will not result in burnout of the two coils.

Figure 5:
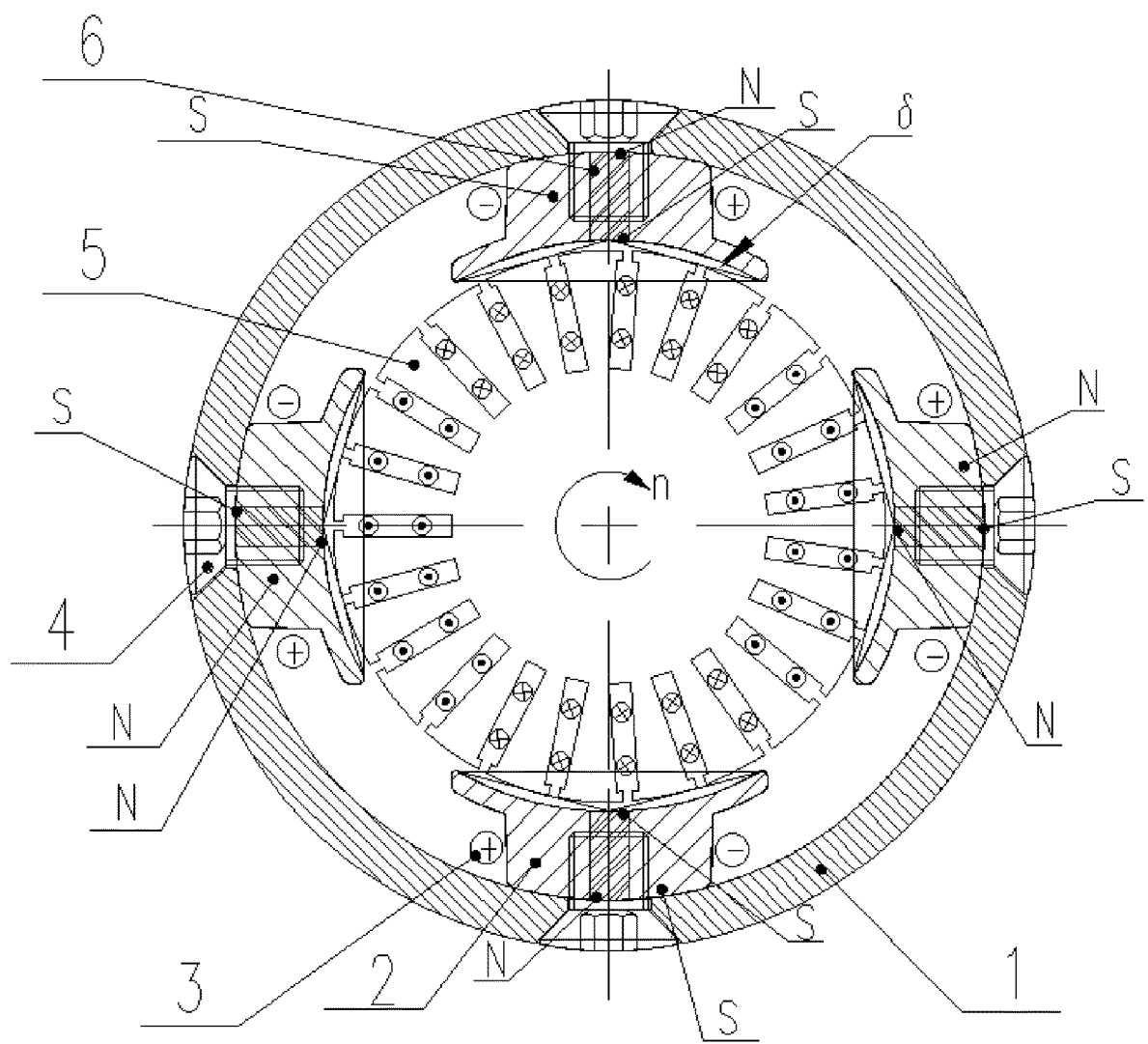
FIG. 5 is a structural diagram of embodiment four of the present invention.

Referring to FIG. 5, which is a structural diagram of embodiment four of the present invention. In the embodiment, the magnetic paths of the electrical excitation structure and the permanent magnet structure are coupled in the direction of normal coupling of the permanent magnet magnetic paths, the plurality of permanent magnet magnetic poles 6 are arranged in the radial direction of the armature 5 respectively. Each of the permanent magnet magnetic pole 6 is connected to the corresponding electrical excitation magnetic pole 2 and the machine housing 1, and the magnetic paths of the permanent magnet magnetic poles 6 are connected in parallel with the magnetic paths of the electrical excitation magnetic poles 2.

Figure 6:
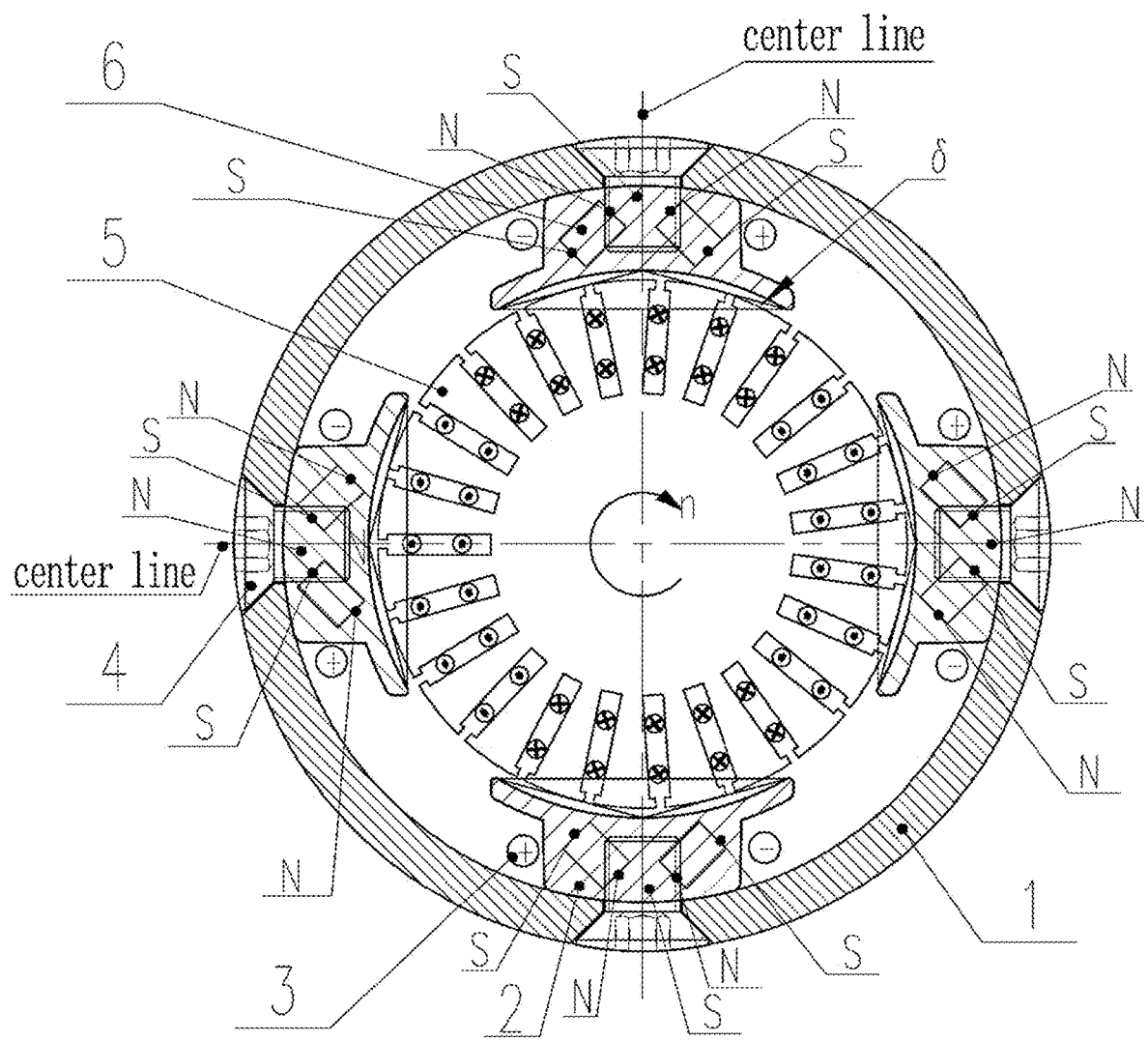
FIG. 6 is a structural diagram of embodiment five of the present invention.

Referring to FIG. 6, which is a structural diagram of embodiment five of the present invention. In the embodiment, the magnetic paths of the electrical excitation structure and the permanent magnet structure are coupled in the direction of normal coupling of the permanent magnet magnetic paths, the plurality of groups of permanent magnet magnetic poles 6 are arranged in the radial direction of the armature 5 respectively. One group of the permanent magnet magnetic poles 6 is mounted on each of the electrical excitation magnetic pole 2 correspondingly, and each group of the permanent magnet magnetic poles 6 comprises a plurality of permanent magnet magnetic poles 6 mounted on the electrical excitation magnetic pole 2 respectively. Each group of the permanent magnet magnetic poles 6 is symmetrically arranged in a V shape or parallel to each other with respect to the center lines of the electrical excitation magnetic poles 2, and the magnetic paths of the permanent magnet magnetic poles 6 are connected in series with the magnetic paths of the electrical excitation magnetic poles 2.

Figure 7:
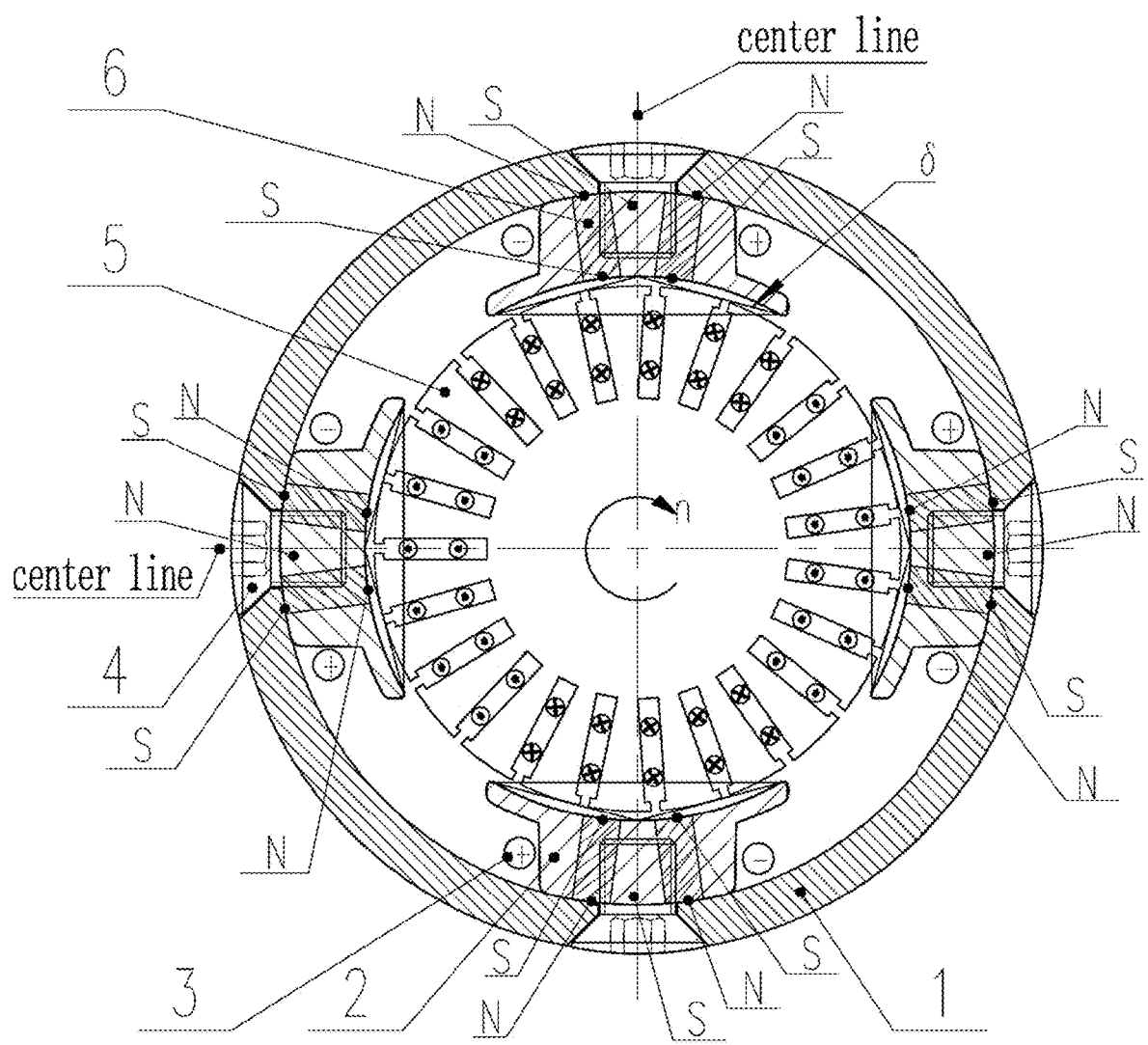
FIG. 7 is a structural diagram of embodiment six of the present invention.

Referring to FIG. 7, which is a structural diagram of embodiment six of the present invention. In the embodiment, the magnetic paths of the electrical excitation structure and the permanent magnet structure are coupled in the direction of normal coupling of the permanent magnet magnetic paths, the plurality of groups of permanent magnet magnetic poles 6 are arranged in the radial direction of the armature 5 respectively. Each group of the permanent magnet magnetic poles 6 is connected to the corresponding electrical excitation magnetic pole 2 and the machine housing 1, a plurality of permanent magnet magnetic poles 6 are mounted on the electrical excitation magnetic pole 2 respectively and each group of the permanent magnet magnetic poles 6 is symmetrically arranged in the V shape or parallel to each other with respect to the center lines of the electrical excitation magnetic poles 2. The magnetic paths of the permanent magnet magnetic poles 6 are connected in parallel or series with the magnetic paths of the electrical excitation magnetic poles 2.

Among the above-mentioned embodiments of the present invention, the hybrid excitation starter forms a variety of technical solutions depending on the different mounting position of the permanent magnet magnetic poles 6 corresponding to the electrical excitation magnetic poles 2, the different mechanical connection methods between the permanent magnet magnetic poles 6 and the electrical excitation magnetic poles 2 or machine housing 1, and the different shape of the permanent magnet magnetic poles 6.

According to the present invention, the no-load speed is effectively adjusted to an ideal result by the magnetic field generated by presetting the permanent magnet magnetic poles 6. As the load characteristics are mainly controlled by the electrical excitation, the parameters of the excitation coil windings 3 can be adjusted independently and separately to adjust and optimize the speed characteristic and the torque characteristic of the starter in load condition, without interaction and constraint by the no-load speed. The mounting method of the permanent magnet magnetic poles 6, tangential (circumferential) coupling or normal (radial) coupling in the direction of magnetic path coupling, series or parallel connection in the magnetic path coupling, as well as the shape, the number and the arrangement of the permanent magnet magnetic poles 6 include, but are not limited to, the forms listed in the previously described embodiments.

The beneficial effects of the present invention are as follows:

a) the no-load characteristics and load characteristics may be set and adjusted independently and separately without interaction with each other;

b) the permanent magnetic field generated by the preset permanent magnets is free from the influence of the working current of the starter; by independently and separately adjustment of the position, shape, direction of magnetic path coupling, connection method of magnetic paths and arrangement method of the permanent magnets, the air-gap magnetic flux during no-load operation may be increased, adjusted and optimized, thus achieves decreasing in the no-load speed.

c) the no-load speed mainly depends on the strength of the magnetic field generated by the permanent magnet magnetic poles 6, and the load characteristics mainly depend on the strength of the magnetic field generated by the electrical excitation; the present invention may independently and separately adjust the speed characteristic and the torque characteristic of the hybrid excitation starter in load condition; for instance, the number of turns and cross-sectional area of the excitation coil windings 3 are adjusted to change the internal resistance of the hybrid excitation starter, thus adjusting the exciting current, the magnetic potential and the air-gap magnetic flux; the exciting current is used to adjust the torque characteristic of the hybrid excitation starter in load operation; the magnetic potential and the air-gap magnetic flux are used to adjust the speed characteristic and the like of the hybrid excitation starter in load operation;

d) the adjustment and optimization of the parameters of the excitation coil windings 3 result in copper saving, weight reduction, energy consumption reduction and efficiency improving;

e) the requirement for safe and steady electric current density is satisfied by adjusting the cross-sectional area of the copper wires forming the excitation coil windings 3.

In general, the present invention may have other embodiments. Those skilled in the art can make various corresponding changes and modifications according to the present invention without departing from the spirit and essence of the present invention, but these changes and modifications shall be incorporated in the protection scope of the claims appended to the present invention.

INDUSTRIAL APPLICABILITY

Compared with the prior art, the advantages of the present invention are as follows:
a) the no-load characteristics and load characteristics of the starter may be adjusted independently and separately without interaction with each other;
b) the permanent magnetic field generated by the preset permanent magnets is free from the influence of the working current of the starter; by adjustment of the position, shape, direction of magnetic path coupling, connection method of magnetic path and arrangement method of the permanent magnets, the air-gap magnetic flux during no-load operation is increased, adjusted and optimized, thus achieves decreasing in the no-load speed;
c) the no-load speed of the starter mainly depends on the strength of the magnetic field generated by the permanent magnet magnetic poles, and the load characteristics mainly depend on the strength of the magnetic field generated by the electrical excitation; so the speed characteristic and the torque characteristic of the starter in load condition are able to be adjusted independently and separately; the number of turns and cross-sectional area of the excitation coil windings can be adjusted to change the internal resistance of the starter, thus adjusting the exciting current, the magnetic potential and the air-gap magnetic flux; the exciting current is used to adjust the torque characteristic of the starter in load operation; the magnetic potential and the air-gap magnetic flux are used to adjust the speed characteristic of the starter in load operation;
d) the adjustment and optimization of the parameters of the excitation coil windings result in copper saving, weight reduction, energy consumption reduction and efficiency improving;
e) and the requirement for safe and steady electric current density is satisfied by adjusting the cross-sectional area of the copper wires forming the excitation coil windings.

What is claimed is:

1. A hybrid excitation starter, wherein comprising a machine housing, an armature, and an electrical excitation structure and a permanent magnet structure provided in the machine housing, the armature and the machine housing are coaxially arranged, magnetic paths of the electrical excitation structure and the permanent magnet structure are coupled in a direction of normal coupling of permanent magnet magnetic paths, the electrical excitation structure comprises a plurality of electrical excitation magnetic poles and excitation coil windings, the electrical excitation magnetic poles are uniformly mounted on the machine housing corresponding to the armature and air gaps are formed between the electrical excitation magnetic poles and the armature, each of the electrical excitation magnetic poles is provided with the excitation coil windings respectively, the permanent magnet structure comprises a plurality of permanent magnet magnetic poles, and the permanent magnet magnetic poles are provided corresponding to the electrical excitation magnetic poles respectively, and are mounted on the machine housing or the electrical excitation magnetic poles respectively, and a magnetic potential formed by coupling the electrical excitation magnetic poles and the permanent magnet magnetic poles together forms a closed magnetic flux linkage by means of the machine housing, the armature and the air gaps, magnetic fields of the electrical excitation magnetic poles and the permanent magnet magnetic poles are in the same direction, thereby controlling the speed characteristic and the torque characteristic of no-load and/or load operation of the starter by independently adjusting parameters of the excitation coil winding.

2. The hybrid excitation starter according to claim 1, wherein the plurality of permanent magnet magnetic poles are arranged in the radial direction of the armature respectively, one permanent magnet magnetic pole is mounted on each of the electrical excitation magnetic poles correspondingly, and the permanent magnet magnetic poles are located on the center lines of the electrical excitation magnetic poles and connected in series with the magnetic paths of the electrical excitation magnetic poles.

3. The hybrid excitation starter according to claim 2, wherein the permanent magnet magnetic poles have a cylindrical, rectangular or polygonal cross-section.

4. The hybrid excitation starter according to claim 2, wherein the hybrid excitation starter is a brushed starter or a brushless starter.

5. The hybrid excitation starter according to claim 1, wherein the plurality of permanent magnet magnetic poles are arranged in the radial direction of the armature respectively, each of the permanent magnet magnetic poles is connected to the corresponding electrical excitation magnetic poles and the machine housing, and the magnetic paths of the permanent magnet magnetic poles are connected in parallel with the magnetic paths of the electrical excitation magnetic poles.

6. The hybrid excitation starter according to claim 5, wherein the permanent magnet magnetic poles have a cylindrical, rectangular or polygonal cross-section.

7. The hybrid excitation starter according to claim 5, wherein the hybrid excitation starter is a brushed starter or a brushless starter.

8. The hybrid excitation starter according to claim 1, wherein a plurality of groups of the permanent magnet magnetic poles are arranged in the radial direction of the armature respectively, one group of the permanent magnet magnetic poles is mounted on each of the electrical excitation magnetic poles correspondingly, each group of the permanent magnet magnetic poles is symmetrically arranged in a V shape or parallel to each other with respect to the center lines of the electrical excitation magnetic poles, and the magnetic paths of the permanent magnet magnetic poles are connected in series with the magnetic paths of the electrical excitation magnetic poles.

9. The hybrid excitation starter according to claim 8, wherein the permanent magnet magnetic poles have a cylindrical, rectangular or polygonal cross-section.

10. The hybrid excitation starter according to claim 8, wherein the hybrid excitation starter is a brushed starter or a brushless starter.

11. The hybrid excitation starter according to claim 1, wherein a plurality of groups of the permanent magnet magnetic poles are arranged in the radial direction of the armature respectively, each group of the permanent magnet magnetic poles is connected to the corresponding electrical excitation magnetic poles and the machine housing, each group of the permanent magnet magnetic poles is symmetrically arranged in a V shape or parallel to each other with respect to the center lines of the electrical excitation magnetic poles, and the magnetic paths of the permanent magnet magnetic poles are connected in parallel or series with the magnetic paths of the electrical excitation magnetic poles.

12. The hybrid excitation starter according to claim 11, wherein the permanent magnet magnetic poles have a cylindrical, rectangular or polygonal cross-section.

13. The hybrid excitation starter according to claim 12, wherein the plurality of permanent magnet magnetic poles are mounted on the machine housing between the adjacent electrical excitation magnetic poles.

14. The hybrid excitation starter according to claim 11, wherein the hybrid excitation starter is a brushed starter or a brushless starter.

15. The hybrid excitation starter according to claim 1, wherein the magnetic fields of the electrical excitation structure and the permanent magnet structure are directly coupled or coupled by means of a magnetic conductive bridge.

16. The hybrid excitation starter according to claim 15, wherein the permanent magnet magnetic poles have a cylindrical, rectangular or polygonal cross-section.

17. The hybrid excitation starter according to claim 15, wherein the hybrid excitation starter is a brushed starter or a brushless starter.

18. The hybrid excitation starter according to claim 1, wherein the permanent magnet magnetic poles have a cylindrical, rectangular or polygonal cross-section.

19. The hybrid excitation starter according to claim 1, wherein the hybrid excitation starter is a brushed starter or a brushless starter.

20. A hybrid excitation starter, wherein comprising a machine housing, an armature, and an electrical excitation structure and a permanent magnet structure provided in the machine housing, the armature and the machine housing are coaxially arranged, magnetic paths of the electrical excitation structure and the permanent magnet structure are coupled in a direction of tangential coupling of permanent magnet magnetic paths, the electrical excitation structure comprises a plurality of electrical excitation magnetic poles and excitation coil windings, the electrical excitation magnetic poles are uniformly mounted on the machine housing corresponding to the armature and air gaps are formed between the electrical excitation magnetic poles and the armature, each of the electrical excitation magnetic poles is provided with the excitation coil windings respectively, the permanent magnet structure comprises a plurality of permanent magnet magnetic poles, and the permanent magnet magnetic poles are provided corresponding to the electrical excitation magnetic poles respectively, and are mounted on the machine housing or the electrical excitation magnetic poles respectively, and a magnetic potential formed by coupling the electrical excitation magnetic poles and the permanent magnet magnetic poles together forms a closed magnetic flux linkage by means of the machine housing, the armature and the air gaps, magnetic fields of the electrical excitation magnetic poles and the permanent magnet magnetic poles are in the same direction, thereby controlling the speed characteristic and the torque characteristic of no-load and/or load operation of the starter by independently adjusting parameters of the excitation coil winding, the plurality of permanent magnet magnetic poles are uniformly arranged in the circumferential direction of the armature respectively and mounted between the adjacent electrical excitation magnetic poles, each of the permanent magnet magnetic poles is connected to the left and right adjacent electrical excitation magnetic poles, and the magnetic paths of the permanent magnet magnetic poles are connected in parallel with the magnetic paths of the electrical excitation magnetic poles.

* * * * *